(12) United States Patent
Suits et al.

(10) Patent No.: US 6,518,964 B1
(45) Date of Patent: Feb. 11, 2003

(54) APPARATUS, SYSTEM, AND METHOD FOR SIMPLIFYING ANNOTATIONS ON A GEOMETRIC SURFACE

(75) Inventors: Frank Suits, Garrison, NY (US); James T. Klosowski, Rye, NY (US); William P. Horn, Scarsdale, NY (US); Gerard Lecina, Suresnes (FR)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 09/686,643

(22) Filed: Oct. 10, 2000

(51) Int. Cl.[7] .............................................. G06T 17/00
(52) U.S. Cl. ...................................... 345/419; 345/421
(58) Field of Search ............................... 345/418, 419, 345/420, 422, 421, 423, 424

(56) References Cited

U.S. PATENT DOCUMENTS

| | | | |
|---|---|---|---|
| 5,448,686 A | | 9/1995 | Borrel et al. |
| 5,903,458 A | * | 5/1999 | Stewart et al. ............... 345/418 |
| 5,929,860 A | | 7/1999 | Hoppe |
| 6,046,744 A | * | 4/2000 | Hoppe ......................... 345/419 |
| 6,064,393 A | * | 5/2000 | Lengyel et al. ............. 345/419 |
| 6,100,902 A | | 8/2000 | Horikawa et al. |
| 6,362,820 B1 | * | 3/2002 | Hoppe ......................... 345/419 |
| 6,377,257 B1 | * | 4/2002 | Borrel et al. ................ 345/419 |

OTHER PUBLICATIONS

M. Garland and P. S. Heckbert, "Surface Simplification Using Quadric Error Metrics," Carnegie Mellon Univ., 7 pages.

M. Garland and P. S. Heckbert, "Simplifying Surfaces with Color and Texture Using Quadric Error Metrics," Carnegie Mellon Univ., 8 pages.

P. Cignoni, C. Montani, C. Rocchini, R. Scopigno, "A general method for preserving attribute values on simplified meshes," Istituto di Elaborazione dell'Informazione, pp. 59–66, p. 518.

(List continued on next page.)

*Primary Examiner*—Cliff N. Vo
(74) *Attorney, Agent, or Firm*—Louis P. Herzberg

(57) ABSTRACT

A computer system and method for simplifying annotations on a surface includes a tolerance process creates a tolerance window lying in a plane and centered on the query point at the end of a test edge and perpendicular to the test edge. The tolerance window is defined by a first tolerance that specifies an amount of first error measured by the distance from a simplified path to an original path in the plane tangent to the surface, and a second tolerance that specifies an amount of second error measure by the distance from the simplified path to the original path in the plane perpendicular to the surface. The original path is a set of original edges on the surface. A point projection process that projects a second end point of one or more second edges onto the plane of the tolerance window. The second edges has the query point also as an end point where the projection of the second end points are projected points. An invalidation process marks an edge as "invalid" and removes it both from the list of simplifiable edges and the final list of simplified edges. A selection process selects one of the second end points that has a projected point within the plane containing the tolerance window, deletes the query point, and connects the origin point to the respective second end point, to create a new edge that replaces the test edge and respective second edges in the set of original edges to create the simplified path.

13 Claims, 11 Drawing Sheets

OTHER PUBLICATIONS

H. Hoppe, "New Quadric Metric for Simplifying Meshes with Appearance Attributes," Microsoft Research, 8 pages.

Paul S. Heckbert, "Survery [sic] of Texture Mapping," Pixar, *IEEE Computer Graphics and Applications,* Nov. 1986, pp. 321–332.

J. Chen and Y. Han, "Shortest Paths on a Polyhedron," Dept. of Computer Science, Univ. of Kentucky, 1990 ACM, pp. 360–369.

G. Barequet, D. Z. Chen, O. Daescu, M. T. Goodrich, J. Snoeyink, "Efficiently Approximately Polygonal Paths in Three and Higher Dimensions," ACM 1998, pp. 317–326.

D. Eu and G. T. Toussaint, "On Approximating Polygonal Curves in Two and Three Dimensions," School of Computer Science, McGill Univ., Montreal, Quebec, 1994 by Academic Press, Inc., pp. 231–246.

P. Linstrom, G. Turk, "Fast and Memory Efficient Polygonal Simplification," Georgia Institute of Technology, 7 pages.

P. S. Heckbert and M. Garland, "Survey of Polygonal Surface Simplification Algorithms," School of Computer Science, Carnegie Mellon University, May 1, 1997, pp. 1–29.

Peter Lindstrom, "Out–of–Core Simplification of Large Polygonal Models," Georgia Institute of Tech., *Proceedings of ACM SIGGRAPH 2000,* pp. 1–4.

J. Rossignac and P. Borrel, "Multi–resolution 3D approximations for rendering complex scenes," Interactive Geometric Modeling, IBM TJ Watson Research Center, pp. 455–465.

\* cited by examiner

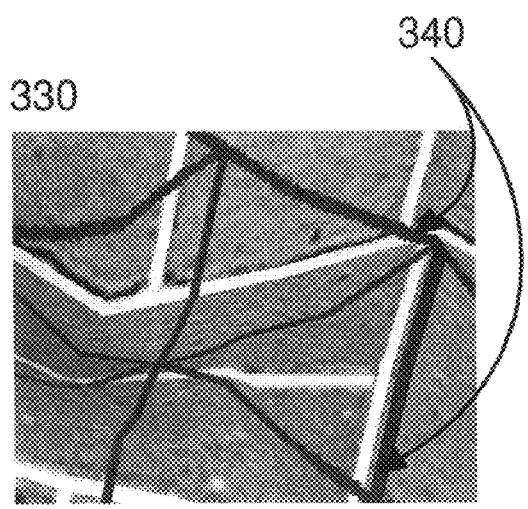 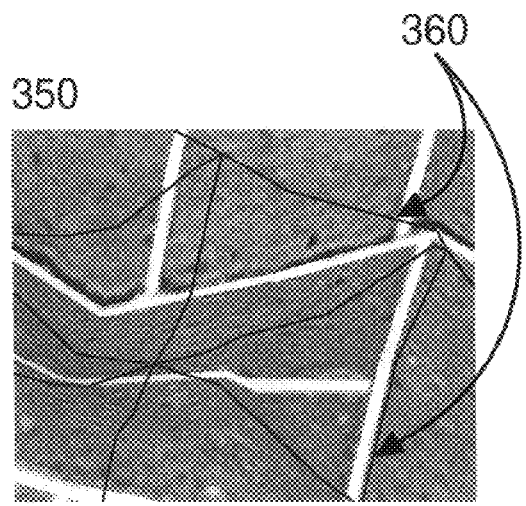
Figure 3a
Figure 3b

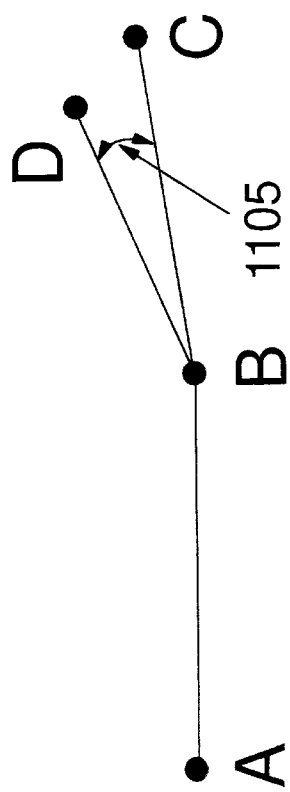
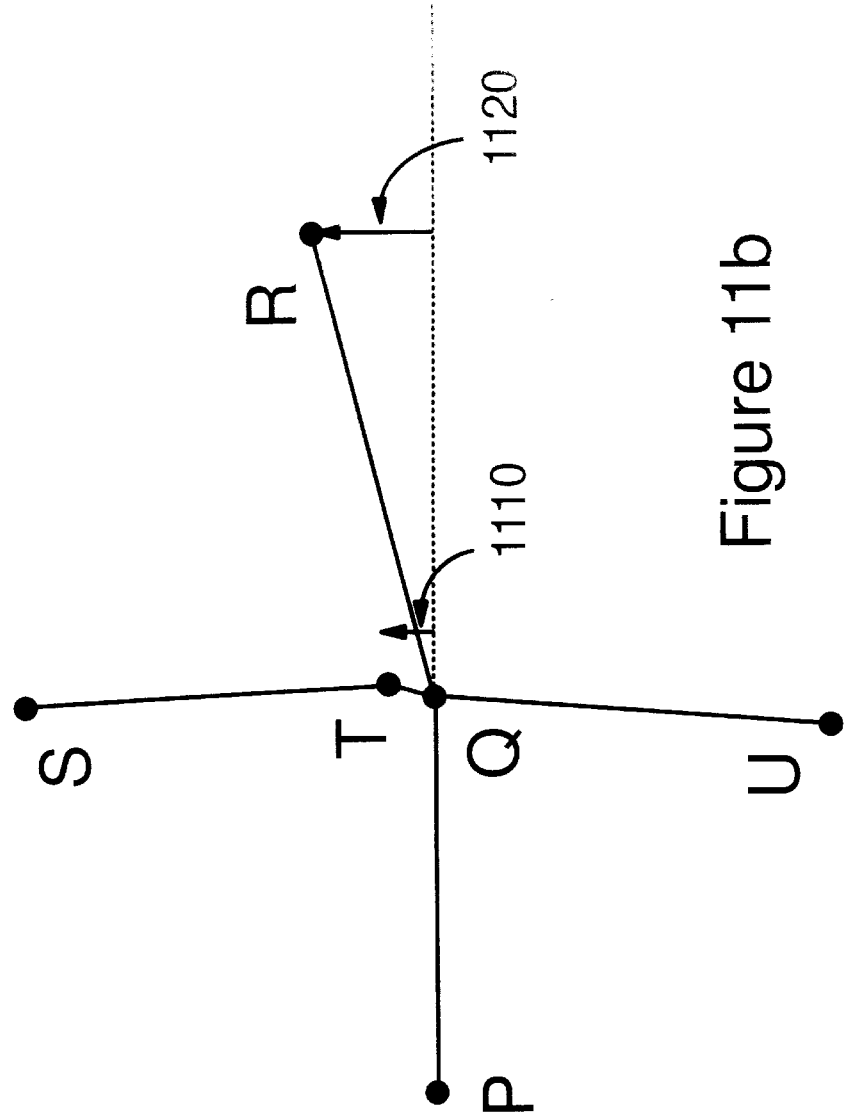
Figure 11a
Figure 11b

APPARATUS, SYSTEM, AND METHOD FOR SIMPLIFYING ANNOTATIONS ON A GEOMETRIC SURFACE

FIELD OF THE INVENTION

This invention relates to the field of geometric modeling. More specifically, the invention relates to computation, visualization and/or annotation of geometric models.

BACKGROUND OF THE INVENTION

In CAD/CAM and other areas, one needs to view and interact with 3D models obtained from a local machine or a remote server. These 3D models contain both geometry to define their shapes and surface features, such as color and annotations. Some annotations correspond to a two-dimensional figure mapped onto the surface of the geometric model. In order to improve performance, there is also a growing need to represent these complex three-dimensional models by simplified versions that are less expensive to store in memory on a computer, faster to transmit across a network from one computer to another computer, and faster to render on a computer. To address this, many techniques have been developed to simplify a model with minimal loss in perceived quality. See, for example, U.S. Pat. No. 5,929,860 or the article "Surface Simplification Using Quadric Error Metrics," by M. Garland and P. Heckbert, in Computer Graphics Proceedings, Annual Conference Series, 1997, pages 209–216. Such techniques attempt to reduce the geometry of the model so that when the simplified model is rendered on a computer, the viewer will be able to perceive few, if any, differences as compared to a rendering of the original model. To accomplish this goal, many of the simplification techniques take the attributes of the model into account as well when simplifying the geometry. See, for example, U.S. Pat. No. 6,100,902; P. Cignoni, C. Montani, C. Rocchini, and R. Scopigno, "A General Method for Preserving Attribute Values on Simplified Meshes", Proceedings of IEEE Visualization, pages 59–66, 1998; M. Garland and P. Heckbert, "Simplifying Surfaces with Color and Texture Using Quadric Error Metrics," Proceedings of IEEE Visualization, pages 264–269, 1998; and H. Hoppe, "New Quadric Metric for Simplifying Meshes with Appearance Attributes," Proceedings of IEEE Visualization, pages 59–66, 1999. These techniques let the attributes guide the simplification process so that the geometry and the attributes of the simplified model appear the same as in the original model. To further preserve the overall appearance of the model, the annotations must be mapped onto the simplified model when simplification techniques are utilized, since the annotations can convey a significant amount of information.

A conventional way to perform the mapping from an image to the surface of an object is called, "texture mapping" and is commonly used to represent features with high detail on a surface containing few polygons. If the object to be mapped onto a nearby surface corresponds to a geometric mesh, comprised of vertices connected by lines, then the use of texture mapping to depict that mesh on the new surface would require rendering the mesh and then texture mapping it onto the surface. Although there are established techniques for texture mapping surface features onto an object, they do not separate the annotative texture from the contextual texture. Texture mapping, thoroughly described by P. Heckbert in "Survey of Texture Mapping", IEEE Computer Graphics and Applications, volume 6, number 11, pages 56–67, November 1986, refers to a technique for mapping an image onto the surface of a model. Texture mapping has been commonly used to map annotations onto the surface of a model. To accomplish this, the annotations are first rendered as an image and stored in the memory of a computer. When the model is being viewed, the texture map of the annotations is applied to the surface of the model to convey the additional information provided by the annotations. Using such an approach, the annotations of a model can be mapped onto the original or simplified surface of the model, since they are stored in the form of an image.

D. Eu and G. T. Toussaint, in "On approximating polygonal curves in two and three dimensions." CVGIP: Graph. Models Image Process., 56(3):231–246, May 1994, describe techniques for simplifying paths in space using a "parallel strip" concept that results in a simplified version of the original path in three-dimensions that does not depart from the original path by more than the allowed tolerance. G. Barequet, D. Chen, O. Daescu, M. Goodrich, and J. Snoeyink in "Efficiently approximating polygonal paths in three and higher dimensions," Proc. 14th Annu. ACM Sympos. Comput. Geom., pages 317–326, 1998, describe a refined algorithm for simplifying paths in three-dimensions more efficiently.

PROBLEMS WITH THE PRIOR ART

Texture mapping requires specialized graphics hardware for adequate performance during viewing, and that hardware is not currently guaranteed to be present on all computers. In addition, texture mapping requires rendering one or more views of the annotations from different viewpoints, and projecting the rendered images onto the surface via texture coordinates. When multiple images are used to represent the annotations of the model at the same time, differences in rendering parameters between images may result in a discontinuity where the images border each other and this discontinuity can stand out as a disturbing artifact. Annotations that do not appear seamless may be hard to interpret because the eye is drawn to the abrupt changes in surface characteristics rather than the actual features on the surface. Consequently, the annotations may become an ineffective means for conveying the additional information to the viewer.

Texture maps also suffer from blurring and pixelization at high magnification. Since the annotations are stored as an image, they are recorded at a fixed resolution. Typically the resolution of the image is measured in terms of the number of pixels in width and height. If the viewer zooms into the model to see the surface details more closely, the annotations texture map will appear blurry and unnatural. When surface annotations become blurred at high magnifications, they lose their impact as informative surface markup, and instead appear as an unnatural image pasted onto the surface. When the annotations are integral with the texture map, they lose their visual impact as surface markup and merge with the background features in a way that detracts from, rather than enhances, their visual importance. The end result is that the information conveyed by the annotations will be lost by the viewer.

Texture maps are most efficient for simple geometric models. For complex models, many additional images, from different viewpoints, will be required. This will greatly exacerbate the discontinuity problem mentioned previously.

Existing techniques for simplifying paths in two- and three-dimensions do not account for paths that are attached to surfaces, nor do they allow different sensitivities to error tangent and perpendicular to the surface. This leads to annotations that are either under-simplified, or prone to penetrate or float above the surface in an artificial manner.

OBJECTS OF THE INVENTION

An object of this invention is an improved system and method to simplify annotations on a surface.

An object of this invention is an improved system and method to simplify the number of line segments used as annotations on a surface.

An object of this invention is an improved system and method to simplify the number of line segments used as annotations on a surface using a directed asymmetric tolerance window that allows a different degree of simplification in the plane tangent to the surface, compared to the tolerance perpendicular to the surface.

SUMMARY OF THE INVENTION

The present invention is a computer system and method for simplifying annotations on a surface. A tolerance process creates a tolerance window lying in a plane and centered on the query point at the end of a test edge and perpendicular to the test edge. The tolerance window is defined by a first tolerance that specifies an amount of first error measured by the distance from a simplified path to an original path in the plane tangent to the surface and a second tolerance specifies an amount of second error measure by the distance from the simplified path to the original path in the plane perpendicular to the surface. The original path is a set of original edges on the surface. A point projection process that projects a second end point of one or more second edges onto the plane of the tolerance window. The second edges has the query point also as an end point where the projection of the second end points are projected points. An invalidation process marks an edge as "invalid" and removes it both from the list of simplifiable edges and the final list of simplified edges. A selection process selects one of the second end points that has a projected point within the plane containing the tolerance window, deletes the query point, and connects the origin point to the respective second end point, to create a new edge that replaces the test edge and respective second edges in the set of original edges to create the simplified path.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 3 conveys the benefits of rendering annotations as stroked lines rather than part of a texture map.

FIG. 11 is a diagram showing the rejection of an edge for simplification based on the collinearity and minimum angle criteria.

DETAILED DESCRIPTION OF THE INVENTION.

Figure 1:
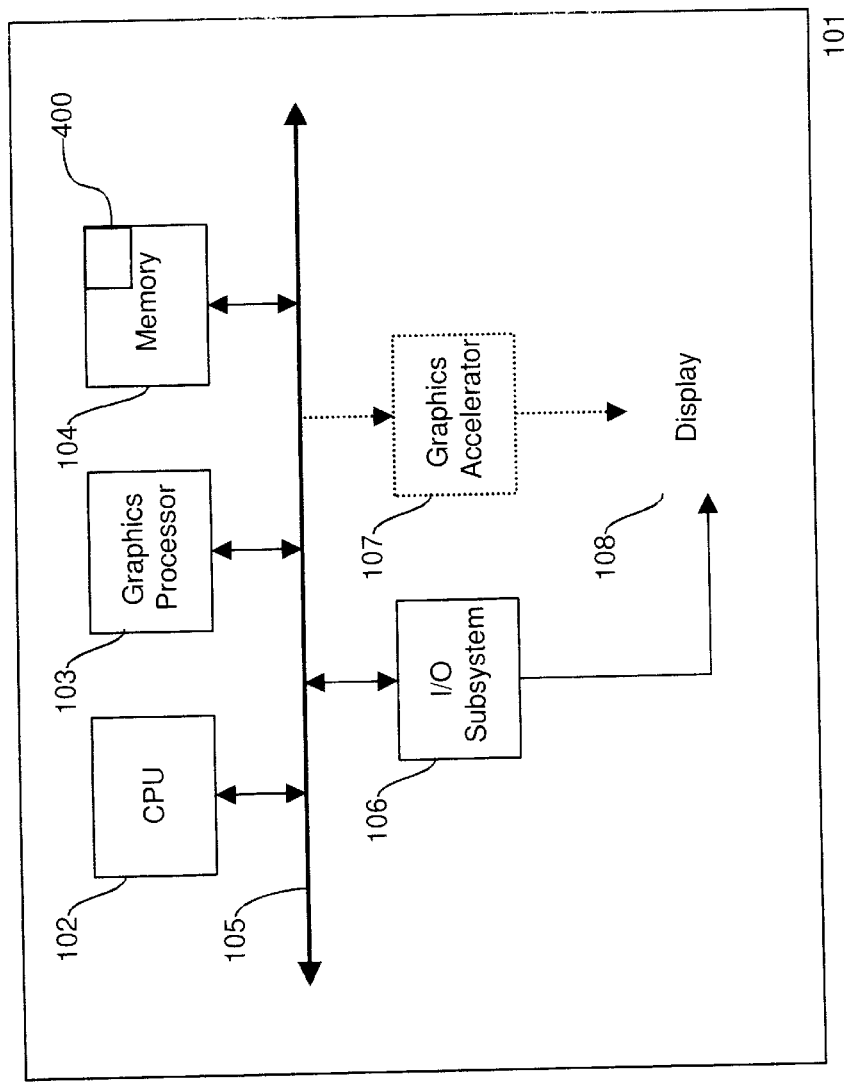
FIG. 1 is a block diagram on one preferred embodiment of the system showing the client/server computing environment.
Figure 4:
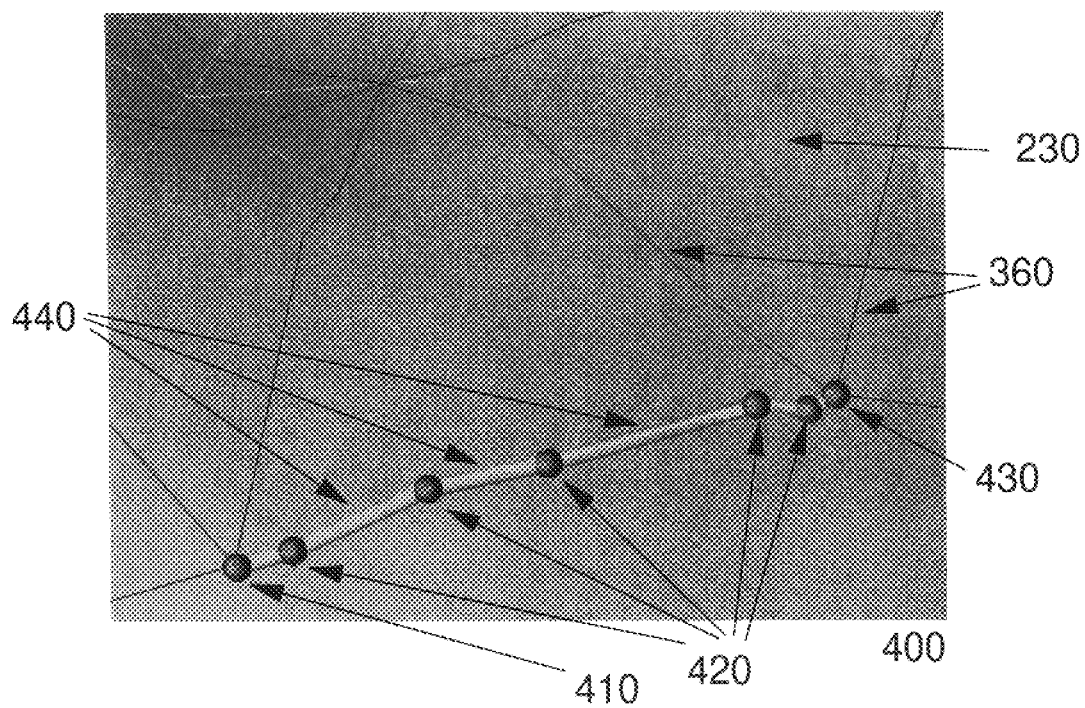
FIG. 4 shows a path consisting of line segments following a triangulated surface.

Referring now to the drawings, and more particularly, FIG. 1 is a block diagram of a preferred embodiment geometric modeling system 101 that includes a memory 104 where one or a plurality of geometric models are stored. One or more Central Processing Units (CPU) 102 access the model via the internal bus 105 and assist a graphics processor 103 in rendering the image and conveying it via the I/O subsystem 106 and the graphics accelerator 107 to the display 108. Optionally, the internal bus 105 may be connected to a network interface to transmit the geometric models across a network to remote modeling systems. These components are all well-known. A novel annotation simplification process 400, described in more detail in FIG. 4, is executed by one or more of the CPUs.

Figure 2:
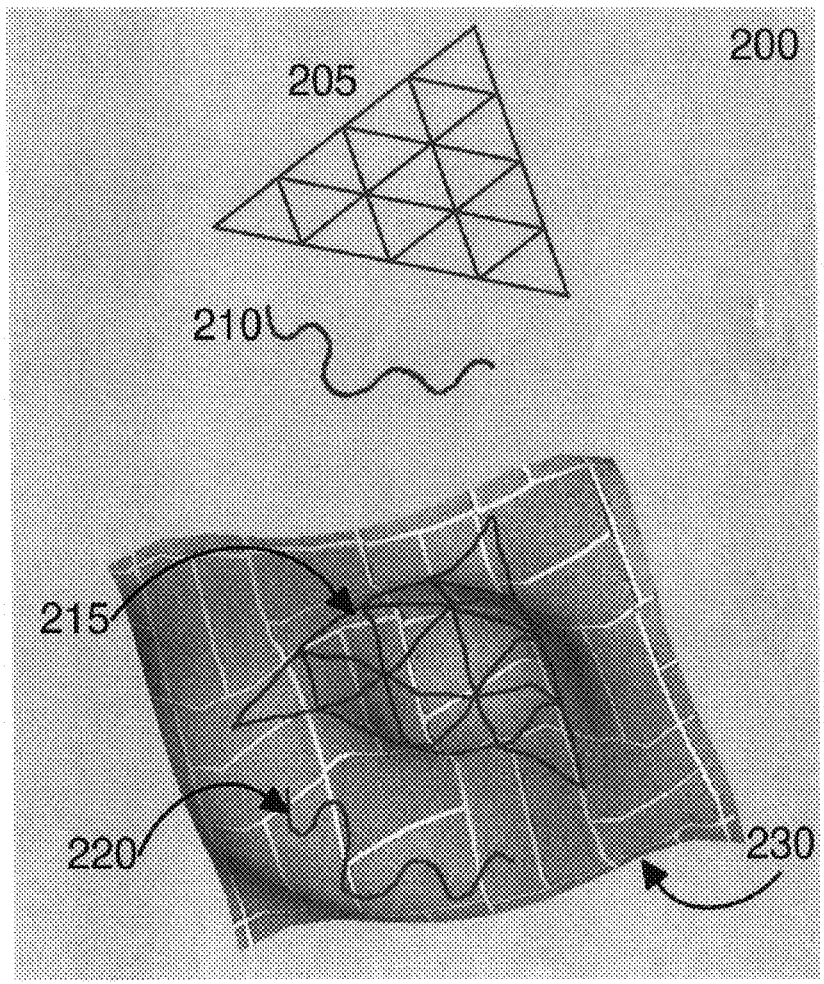
FIG. 2 illustrates the concept of different types of annotations attached to the surface of an object.

FIG. 2 shows an example 200 of annotations on the surface of a model 230. The geometry of the model defines the actual shape of the surface. In this example, the geometry represents an undulating surface. The attributes for this model are the colors that give it the appearance of a brick wall. The annotations, e.g. 205, 210, are the line segments that are draped onto the surface of the model. Here, as an example, line segments form a triangular mesh 205 and a curved line 210. After a novel draping process, described below, the projected annotations 215, 220 maintain the same overall appearance as the original annotations 205, 210. Models 230 are well defined in the art, as are annotations.

We present a technique for simplifying surface annotations based on directed, asymmetric tolerance. By maintaining the annotations as geometry, as opposed to textures, we are able to simplify them while still maintaining the overall appearance of the model over a wide range of magnifications. Texture maps may still be used to provide low-resolution surface detail, such as color.

We start with the most general scenario in which a three-dimensional annotation consisting of vertices, arbitrarily connected by edges, is attached to a nearby surface. The goal is to retain the appearance of the annotation as if it were draped onto the surface, as depicted in FIG. 2, which illustrates the concept of different types of annotations attached to the surface of an object. The annotation may be a simple connected path of line segments, or a complex mesh containing many edges that meet at common vertices.

FIG. 3a is a close-up image 330 of the model in FIG. 2, using the conventional prior art technique of texture maps to convey the annotation information. In this illustration, the annotations 340 are rendered and stored as an image and then texture mapped onto the model geometry. Under high magnification, the annotations are distorted, appearing blurry and pixelized, due to the fixed resolution of the texture map, which causes a distracting artifact in the rendered image. The annotations appear very jagged when the viewer zooms into the image. The lack of fidelity in representing the annotation caused by the texture map in this example can lead the viewer to make incorrect conclusions about what is being seen.

FIG. 3b is a close-up image 350 of the model in FIG. 2, using the current invention to simplify the annotations 360 onto the model geometry. Since the annotations have been maintained as geometry, as opposed to texture maps, their appearance is cleanly preserved even at high magnification levels.

FIG. 4 shows part of an annotation 360 on the surface 230 of a model consisting of multiple line segments 440 extending from an initial point 410 to an end point 430, and connecting multiples vertices 420 also on the surface. Since the path is fairly direct and the surface is relatively flat, there is an opportunity to depict the same path with fewer segments without losing the general shape of the path.

Figure 5:
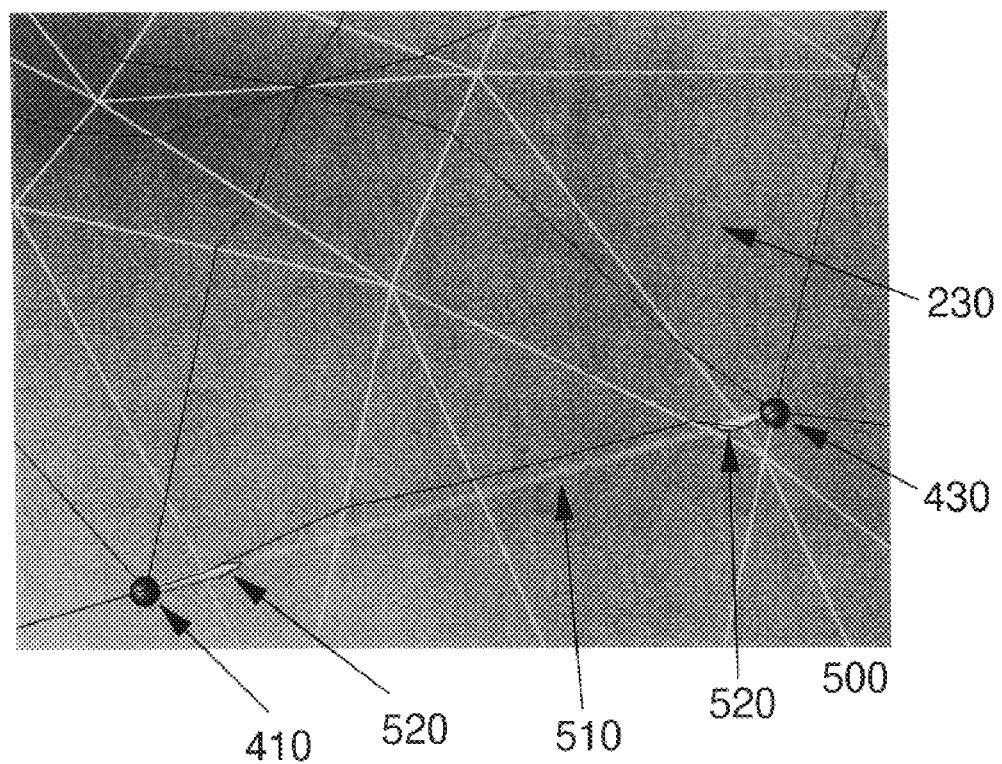
FIG. 5 demonstrates the deleterious effect of simply connecting the outer end points of the path and removing all the interior vertices.

FIG. 5 shows the case of oversimplification, in which vertex 410 is connected directly to vertex 430 by a single line segment 510 that pierces the surface 230 at two points 520, leaving the segment floating above the surface in some regions, and hidden beneath the surface in others.

Figure 6:
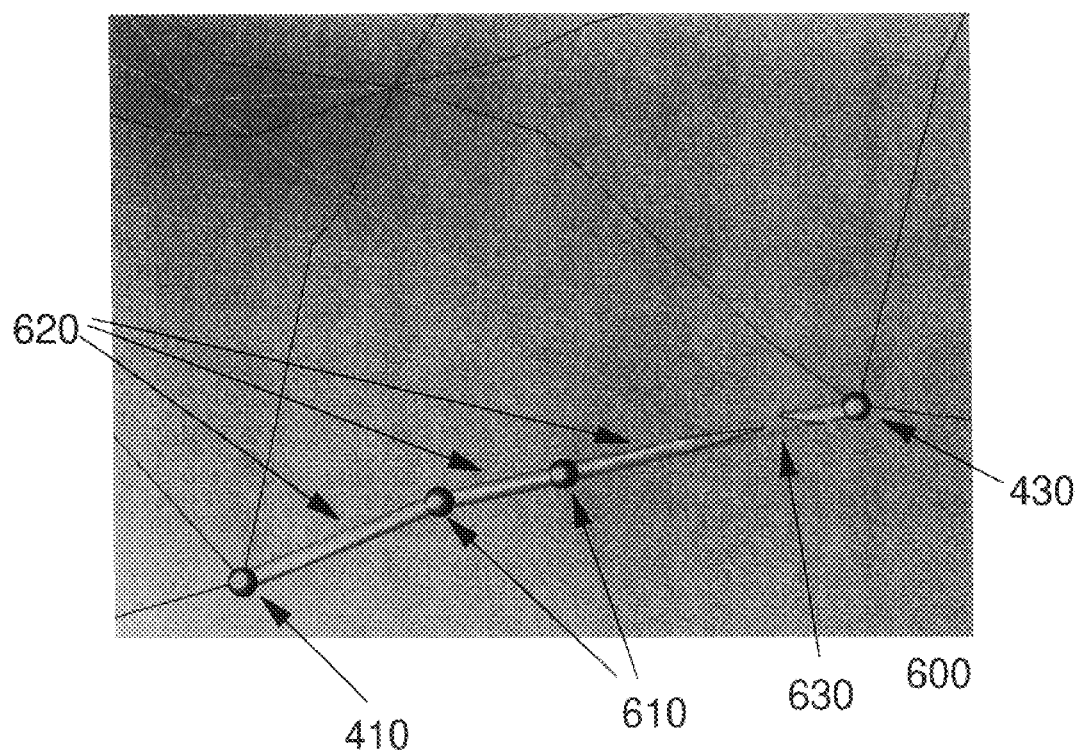
FIG. 6 is a compromise between the original path of FIG. 3 and the oversimplified path of FIG. 4.

FIG. 6 is a compromise between the original path of FIG. 4 and the oversimplified path of FIG. 5. Here the number of segments 620 in the path has been greatly reduced without significantly altering the shape of the path and its conformance to the surface. Also, fewer vertices 610 are required to define the path, resulting in less memory for representation and faster rendering compared to the original, non-simplified path. The path still penetrates 630 the surface, but the depth is small enough that rendering by standard methods will not show local obscuration by the surface.

For rendering purposes, it is important that the edges of an annotation on a surface remain close to the surface without penetrating it, while edge position errors within the plane of the surface are much less noticeable. The algorithm described here is unique because it is tailored to the appearance of an annotation rendered on a surface and it allows alteration of the topology of the annotation without significantly impacting the appearance. This can produce a simplified annotation that conforms to the surface yet contains far fewer edges than the original annotation.

Figure 7:
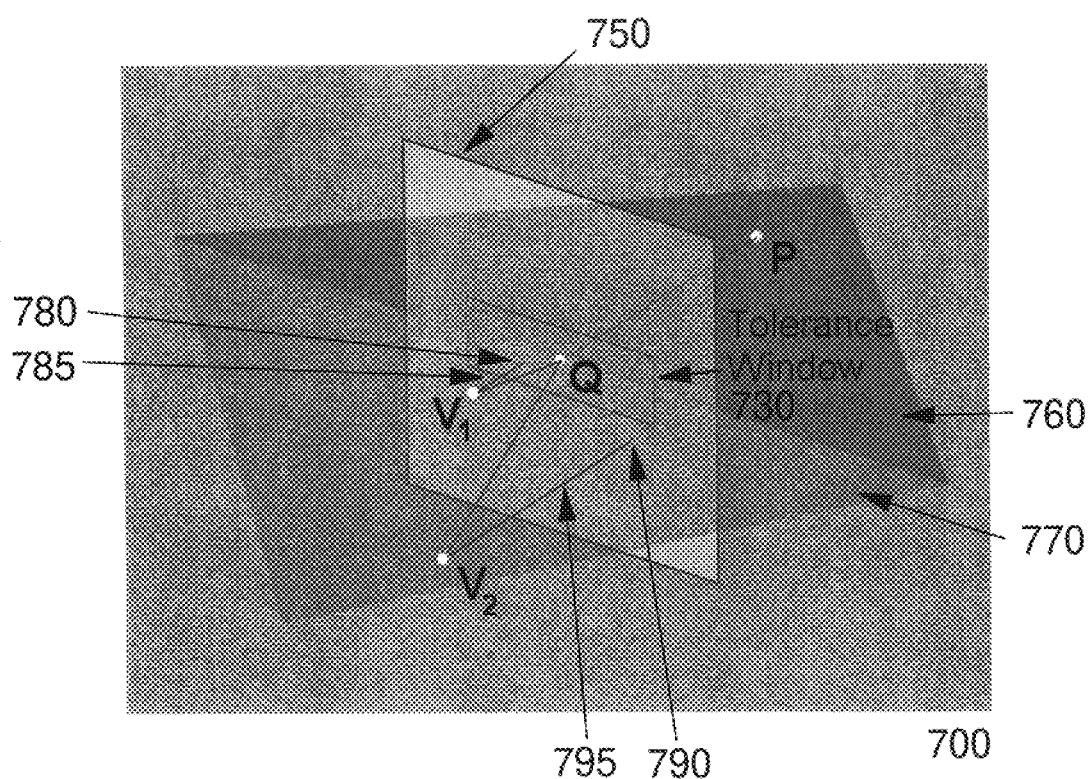
FIG. 7 shows the directed, asymmetric tolerance window constructed for edge PQ which connects at Q to segments QV1 and QV2.
Figure 8:
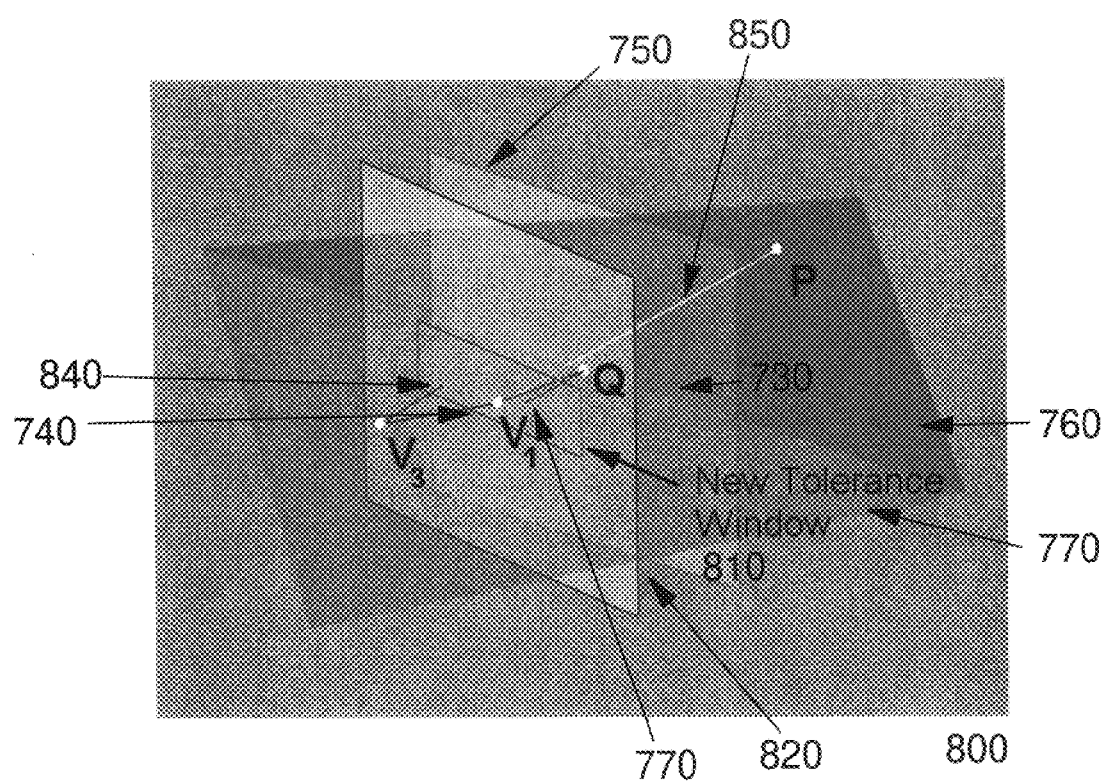
FIG. 8 depicts the new tolerance window constructed after simplifying PQ with QV1.

The edge simplification algorithm accommodates meshes and self-intersecting paths by special handling of vertex stars of degree greater than two. Here we use the term vertex star to refer to the set of all edges that contain a vertex. An edge with a vertex shared by many other edges is simplified with the joining edge that is best paired with it, which may not be well-defined for arbitrary irregular meshes containing high order vertex stars and very acute angles between edges sharing a vertex. The algorithm outlined below refers to FIGS. 7 and 8, which depict an edge, PQ, being simplified with other edges, QV1 and QV2, joining at Q. In FIG. 7, the vertex star at Q has degree three since it is shared by edges PQ, QV1, and QV2. FIG. 8 shows the continuation of the algorithm where PQ and QV1 have been simplified into the new edge, PV1, and now the edges shared by V1 are tested for simplification. In this case the vertex star at V1 has degree two and the only edge to test is V1V3.

The degree of simplification achieved depends on the annotation, the surface on which the annotation is draped, and the specified dimensions of the tolerance window. The optimal size of the tolerance window is application-specific and depends independently on the allowed change in shape of the annotation, and how far a line may penetrate a surface before it is partially rendered due to occlusion. The tolerance in the tangent plane of the surface will directly affect how well the shape of the annotation is retained during simplification, and the tolerance perpendicular to the surface controls how much the annotation penetrates or lifts off the surface. Thus the two parameters may be set independently to match the application needs, which relate to the allowed change in appearance of the annotation, and the rendering technique, which determines when a surface triangle obscures a partially buried line.

FIG. 7 shows the directed, asymmetric tolerance window 730 constructed for edge PQ, which connects at Q to segments QV1 and QV2. The tolerance window is centered on Q and perpendicular to the triangle 760 containing PQ, with dimensions set by the in-plane and perpendicular tolerances specified for the simplification run. Note that the tolerance window lies in the plane 750 perependicular to PQ at Q and therefore perpendicular to the local section of the surface defined by the triangle 760 containing PQ. The tolerance plane is not necessarily perpendicular to the next triangle 770 that shares an edge with the triangle 760 containing PQ. By projecting 785 795 the next vertices, V1 and V2, onto the tolerance window 730 we see V1 falls within 780 the window and is a candidate for simplification, while V2 falls outside 790 the window and is not a candidate for simplification.

The algorithm for simplifying the edges is as follows:

Select an edge, PQ, from the list of edges in the annotation.

Construct the tolerance plane 750 at one of the end points, Q, of PQ. This plane contains Q and is perpendicular to PQ. Then construct the tolerance window 730 in the tolerance plane 750 centered on Q, of dimensions Ex and Ey, as specified for the model. For each edge in the annotation that connects with PQ at Q, e.g. QV1 and QV2 in FIG. 7, project the end point that is not Q onto the tolerance plane. If a projected vertex, falls outside the tolerance window 730, then reject it and continue to the next edge in the vertex star at Q. FIG. 7 shows the projection 790 of V2 landing outside of the tolerance window, disqualifying it as a possible edge for simplification.

If the new vertex, V1, does project within 780 the tolerance window, construct a new tolerance plane based on a potential new edge PV1 850, but this tolerance plane is defined as the plane through V1 that is perpendicular not to the segment PV1 but to the projection of PV1 into the original triangle 760 containing PQ, as shown in FIG. 8. Then construct a new tolerance window 810 centered laterally on V1 but in altitude still bisected by the plane containing the original surface triangle 760. This allows the tolerance window to slew laterally while remaining confined in altitude to the original surface tangent plane defined by the original surface triangle 760. Note that in FIG. 8, V1 is centered laterally on the new tolerance window 810, but is slightly below its center. In stepping from PQ to PV1, an intermediate point, Q, will be dropped from the path, but it nevertheless must be tested for projection into the tolerance window as it moves forward along additional segments. When a new tolerance window is made, we must project all the intermediate points along the original path from P to V1 into the new tolerance window, and if any fall outside the window, V1 is not a candidate for simplification and return to vertex Q to test any other edges in the edge star at Q that project within the tolerance window at Q. If all the intermediate points do project within the tolerance window, mark edges PQ and QV1 as "invalid" and continue using the new edge, PV1. In FIG. 8, the only intermediate point is Q, and its projection 770 on the new tolerance window 810 easily fits within, confirming that PV1 is an acceptable simplification of the joined segments PQ and QV1 for the specified tolerance window size.

The process continues at vertex V1, where the edge star of V1 is tested for candidate edges for simplification. Note that V3 would have projected outside the original tolerance window, but projects 840 within the new window and is a candidate for simplification. Thus the new tolerance window has turned slightly to track the curvature of the path from Q to V1 to V3.

The process continues in this direction until no joining edges will fit in the tolerance window, and is then repeated from the P side of edge PQ. Once the complete list of simplifiable edges joining at PQ is obtained, a new edge joining the two endpoints is added to the list of output simplified edges, and each of the original edges that were simplified is marked as "invalid" in the edge list of the original annotation.

With PQ now simplified in both directions and the constituent edges marked invalid, repeat the process with the next edge in the annotation edge list, ignoring any edges that were marked as "invalid" because they have effectively been removed from the original annotation.

Figure 9:
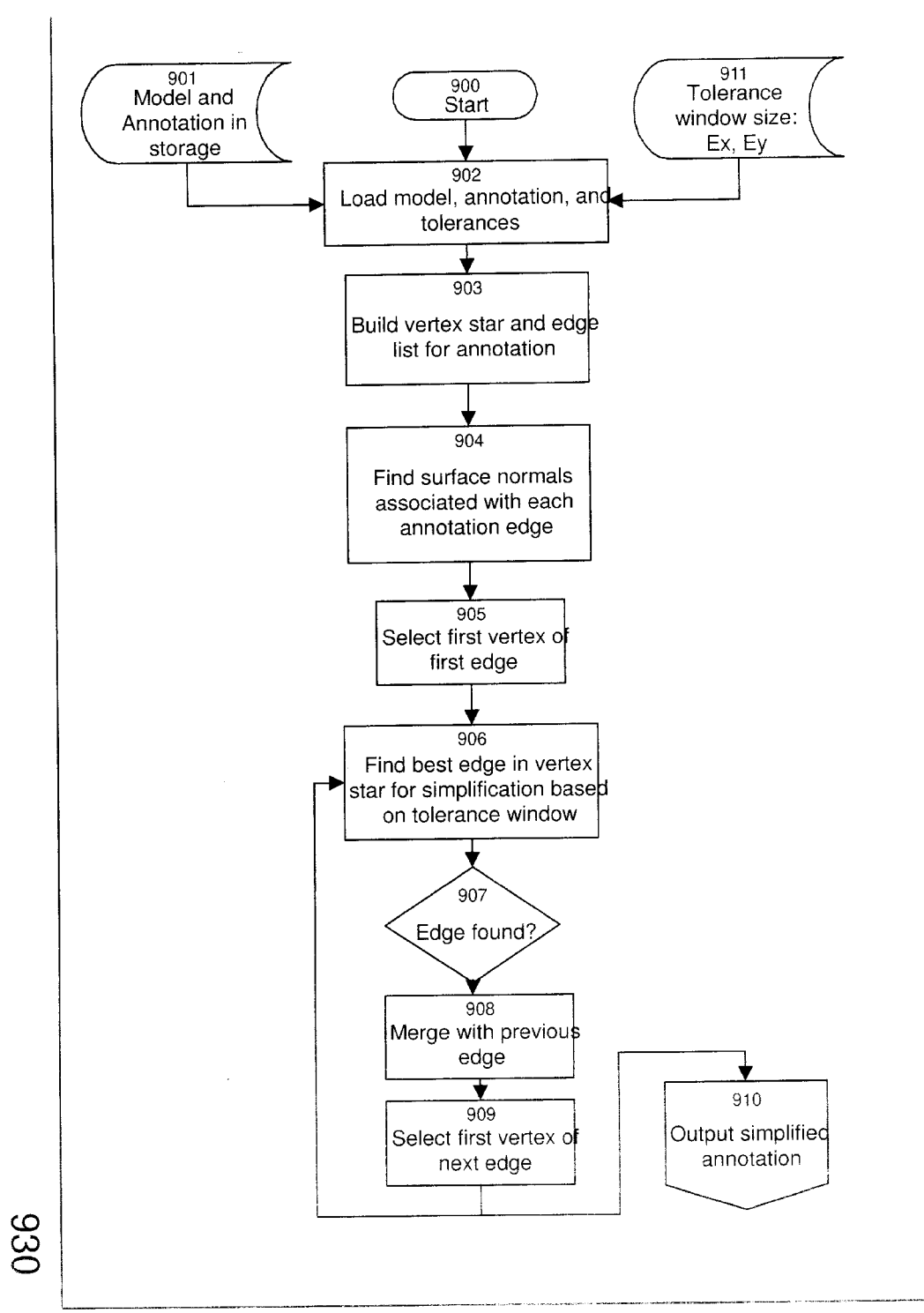
FIG. 9 is a flow chart of the annotation simplification algorithm.

FIG. 9 shows a detailed flowchart of the simplification process described above. The simplification process starts 900 by loading a 3D model and annotation 902 from storage 901, along with the tolerance window dimensions Ex, Ey 911. A preprocessing step 903 builds all the vertex star and edge list information for the annotation for rapid access during the simplification traversal of the edge list. An additional preprocessing step 904 finds the normals of the surface triangles that contain each annotation edge.

The traversal of the edge list begins by selecting 905 the first vertex of the first edge in the edge list. All the edges in the edge star of the chosen vertex are examined 906 using the tolerance window of the simplification according to the algorithm described above. If one or more edges are found 907 as candidates for simplification with the current edge, the best one is chosen based on the additional criteria above and is simplified with the starting edge 908. Then the next vertex is chosen 909, which will either be the second vertex of the edge found in 907, or the second vertex of the initial edge used for the current path. If additional vertices are available, the algorithm repeats by finding the best edge in the star associated with the new vertex; otherwise the simplification is complete and the new lists of edges and vertices are output 910.

The above algorithm works well for paths on surfaces but may create artifacts for annotations containing: (a) vertices shared by more than four edges, (b) edges that form an acute angle at a vertex, (c) short line segments in the star of a vertex. Annotations with these features can produce noticeable errors in the form of bends (or "jogs") and breaks near the problem vertex. To avoid this problem we add an additional set of criteria that prevent the simplification of problem edges. These criteria do not significantly increase the edge count of the simplified results, and they eliminate otherwise glaring deformations in the draped annotation.

The additional criteria are:

If an edge, QV1, forms an angle less than ThetaMin with any other edge in the vertex star at Q, do not simplify it with PQ.

If an edge, QV1, is more collinear with some other edge in the vertex star at Q than it is with PQ, do not simplify it with PQ.

The first criterion fixes the appearance of acute edges at vertices, and the value of ThetaMin will be dependent on the model. FIG. 11a shows an edge AB that cannot simplify with the joining edge BC if the angle 1105 between BC and another edge BD in the edge star at B is less than ThetaMin. The second criterion prevents the simplification of short edges in the wrong direction, which would produce a jog in the edge. FIG. 11b shows edge PQ possibly being simplified with edges QT and QR, both of which, say, project within the tolerance window. Since the perpendicular distance 1110 of T from the line containing PQ is less than the corresponding distance 1120 for QR, segment QT is checked first for simplification with PQ. But since QT is more collinear with QU than with the original edge, PQ, the edge QT is rejected for simplification with PQ and QR becomes a valid option. Not simplifying QT with PQ will allow it later to be simplified with the other edge QU joining at Q with which it is more collinear.

Figure 10:
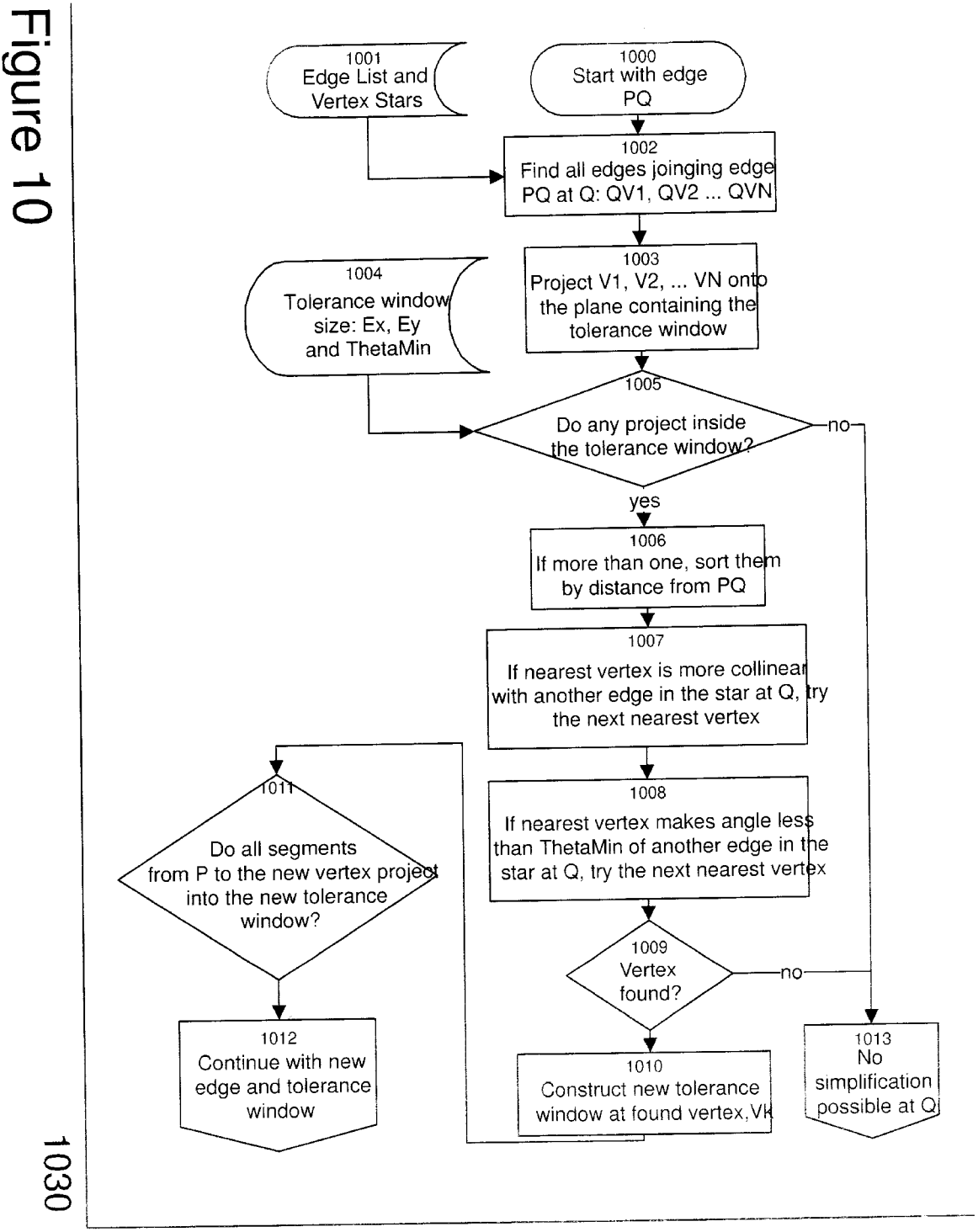
FIG. 10 is a flow chart showing the test of a query point for simplification based on projection within the tolerance window.

FIG. 10 is a flowchart that details the tolerance window projection algorithm. Starting 1000 with edge PQ, find all edges 1002 joining at Q using the edge star list 1001. Then project 1003 the vertices in the edge star onto the tolerance plane and determine 1005 if any fit within the tolerance window 1004. If none falls inside, then no simplification is possible 1014. If more than one fall inside the window then sort them 1006 in order of distance from the line containing PQ. Now the edge star criteria are applied, first by checking the edge with the nearest vertex for greater collinearity 1007 with another edge in the star of Q. If there is a more collinear edge than PQ, test again with the next nearest vertex. If this vertex makes an angle less than ThetaMin with another edge in the star at Q then 1008 try the next nearest vertex. If a vertex, Vk, passes these two tests then 1009 use it to construct 1010 a new tolerance window centered laterally on Vk. As a final check on this vertex, make sure all the intermediate points between P and the current vertex project 1011 into the new tolerance window. If any land outside the window, then reject the vertex as a candidate for simplification. Otherwise continue 1012 with the new edge and tolerance window.

We claim:

1. A computer system for simplifying annotations on a surface, comprising:

one or more memories and one or more central processing units (CPUs);

a tolerance process that creates a tolerance window lying in a plane and centered on the query point at the end of a test edge and perpendicular to the test edge, the tolerance window defined by a first tolerance that specifies an amount of first error measured by the distance from a simplified path to an original path in the plane tangent to the surface, and a second tolerance that specifies an amount of second error measure by the distance from the simplified path to the original path in the plane perpendicular to the surface, the original path being a set of original edges on the surface;

a point projection process that projects a second end point of one or more second edges onto the plane of the tolerance window, the second edges having the query point also as an end point, the projection of the second end points being projected points;

an invalidation process that marks an edge as "invalid" and removes it both from the list of simplifiable edges and the final list of simplified edges; and a selection process that selects one of the second end points that has a projected point within the plane containing the tolerance window, deletes the query point, and connects the origin point to the respective second end point, to create a new edge that replaces the test edge and respective second edges in the set of original edges to create the simplified path.

2. A computer system, as in claim 1, where the tolerance window is any one or more of the following shapes lying in the tolerance plane: a rectangle, square, ellipse, circle, or other parameterized path.

3. A computer system, as in claim 1, where the first tolerance is determined by any one or more of the following: an allowed change in appearance of the annotation, an allowed change in shape of the annotation, an allowed change in the distance of the simplified path from the original path measured in the plane tangent to the surface.

4. A computer system, as in claim 1, where the second tolerance is determined by any one or more of the following: an allowed departure from the surface, an allowed penetration into the surface.

5. A computer system, as in claim 1, where the tolerance window shifts after the new edge is created.

6. A computer system, as in claim 5, where the tolerance window shifts to a second query point, centered on the second query point in azimuth with respect to the original surface tangent, but unchanged in altitude with respect to the original surface tangent.

7. A method, executed on a computer system for simplifying annotations on a surface, the method comprising the steps of:

a. creating a tolerance window centered on the query point at the end of a test edge and lying in a plane perpendicular to the test edge, the tolerance window defined by a first tolerance that specifies an amount of first error measured by the distance from a simplified path to an original path in the plane tangent to the surface, and a second tolerance that specifies an amount of second error measured by the distance from the simplified path to the surface in the plane perpendicular to the surface, the original path being a set of original edges on the surface and the simplified path being the edges that result from the simplification process;

b. projecting a second end point of one or more second edges onto the plane containing the tolerance window, the second edges having the query point also as the an end point, the projection of the second end points being projected points; and c. selecting one of the second end points that has a projected point within the tolerance plane, deletes the query point, and connects the origin point to the respective second end point, to create a new edge that replaces the test edge and respective second edges in the set of original edges to create the simplified path.

8. A method, as in claim 7, further comprising the steps of:

d. shifting the tolerance plane to a second query point in an initial shift direction along the test edge; and e. centering the tolerance plane on the second query point in azimuth with respect to the original surface tangent, but not changing in alititude relative to the original surface tangent.

9. A method, as in claim 7, further comprising the step of repeating steps b and c, but:

f. only creating the new edge if all the of the previous query points also have a query point projection within the shifted tolerance plane, and only if no other edge joining the query point is more collinear with the second edge than the first edge; and g. if any of the previous query points do not have the query point projection within the shifted tolerance plane, terminating the shifting of the tolerance plane in the initial shift direction.

10. A method, as in claim 9, where one or more of the previous query points do not have the query point projection within the shifted tolerance plane and performing the step of:

h. shifting the tolerance plane along the test edge in an opposite direction to the initial shift direction.

11. A method, as in claim 10, further comprising the step of:

i. repeating step e.

12. A method, as in claim 11, further comprising the step of:

j. repeating steps b and f; until k. one or more of the previous query points in the opposite direction do not have a respective query point projection within the shifted tolerance plane in the opposite direction; then l. terminating the shifting of the tolerance plane in the opposite direction.

13. A method, as in claim 12, where after terminating the shifting of the tolerance plane in the opposite direction, a new origin point is selected on a new test edge from the set of original edges, and steps a through l of the method are repeated.

* * * * *

UNITED STATES PATENT AND TRADEMARK OFFICE
CERTIFICATE OF CORRECTION

PATENT NO.    : 6,518,964 B1
DATED         : February 11, 2003
INVENTOR(S)   : Frank Suits et al.

It is certified that error appears in the above-identified patent and that said Letters Patent is hereby corrected as shown below:

<u>Title page,</u>
Item [73], Assignee, should read -- International Business Machines Corporation, Armonk, NY (US), and Dassault, France. --

Signed and Sealed this

Twenty-seventh Day of April, 2004

JON W. DUDAS
*Acting Director of the United States Patent and Trademark Office*